US011632583B2

(12) United States Patent
Gazzini et al.

(10) Patent No.: US 11,632,583 B2
(45) Date of Patent: Apr. 18, 2023

(54) SYSTEM AND PROCESS FOR SYNCHRONIZED MEDIA PLAY

(71) Applicant: Earbuds, Inc., Austin, TX (US)

(72) Inventors: John Gazzini, Austin, TX (US); Justin Good, Austin, TX (US); Jason Fox, Fort Worth, TX (US)

(73) Assignee: Earbuds, Inc., Fort Worth, TX (US)

( * ) Notice: Subject to any disclaimer, the term of this patent is extended or adjusted under 35 U.S.C. 154(b) by 0 days.

(21) Appl. No.: 16/708,469

(22) Filed: Dec. 10, 2019

(65) Prior Publication Data

US 2020/0186859 A1 Jun. 11, 2020

Related U.S. Application Data

(60) Provisional application No. 62/778,135, filed on Dec. 11, 2018.

(51) Int. Cl.
*H04N 21/43* (2011.01)
*H04N 21/242* (2011.01)
(Continued)

(52) U.S. Cl.
CPC ..... *H04N 21/43076* (2020.08); *H04N 21/242* (2013.01); *H04N 21/4302* (2013.01);
(Continued)

(58) Field of Classification Search
CPC ........ H04N 21/43076; H04N 21/4307; H04N 21/4302; H04N 21/242; H04N 21/8547;
(Continued)

(56) References Cited

U.S. PATENT DOCUMENTS 10,536,741 B1 * 1/2020 Madison ............. H04N 21/242
2015/0120953 A1 * 4/2015 Crowe .................... H04L 65/80
709/231

(Continued)

*Primary Examiner* — John R Schnurr

(57) ABSTRACT

Embodiments include processes for media object rendering, including the steps of providing a plurality of clients, the clients including a media client and the clients in communication with a synchronization client, the clients defining a synchronization group. The media clients include instructions for receiving media object content over a network from a content server, rendering the media object content, and random access to the media object content in response to synchronization client seek time instructions. The synchronization client includes instructions to calculate a relative lag and provide seek time instructions to the media clients for a media object being rendered, the relative lag being a running measurement of its offset relative to the synchronization server's clock. The synchronization client periodically queries the clock of a synchronization server. The synchronization server responds to the synchronization client queries with internal clock value as a timestamp and a timestamp for a target time reference within said media object content for the synchronization group, whereby the synchronization client provides seek time to its paired media clients for the media client to move to that offset, establishing and maintaining playback synchronization among the synchronization group.

17 Claims, 4 Drawing Sheets

(51) Int. Cl.
*H04N 21/8547* (2011.01)
*H04N 21/6587* (2011.01)
*H04N 21/647* (2011.01)
*H04N 21/6543* (2011.01)
*H04N 21/44* (2011.01)

(52) U.S. Cl.
CPC . *H04N 21/44004* (2013.01); *H04N 21/64738* (2013.01); *H04N 21/6543* (2013.01); *H04N 21/6587* (2013.01); *H04N 21/8547* (2013.01)

(58) Field of Classification Search
CPC ......... H04N 21/6587; H04N 21/64738; H04N 21/6543; H04N 21/44; H04N 21/44004
See application file for complete search history.

(56) References Cited

U.S. PATENT DOCUMENTS

2019/0115034 A1* 4/2019 Frett ................. H04N 21/4302
2019/0238911 A1* 8/2019 Slutsky ............. H04N 21/8547

\* cited by examiner

SYSTEM AND PROCESS FOR SYNCHRONIZED MEDIA PLAY

BACKGROUND

Field of the Invention

The present invention relates to media rendering, more specifically to synchronized media play.

Description of the Related Art

People often seek to consume media online simultaneously, with the people not necessarily being physically close to each other or the media source(s). When consuming media, people often desire that each experience the same media content at the same time. Achieving this can be tenuous due to network lag and other factors.

SUMMARY

Embodiments of the present invention are directed to systems and processes for synchronized media play for clients participating within a synchronization group, with each client having a media client part and in communication with a synchronization client. Media content is identified for synchronized playback within the synchronization group and a network address is provided to the synchronization group clients for that media object for playback by each of the media clients. Each of the media clients within the synchronization group retrieves media, the media object or a media object segment, and playback is initialized. Periodically during playback, synchronization clients within the synchronization group request the clock value from a synchronization server. The synchronization server responds with its current clock value and its clock value for an offset value within the media object. Using recent synchronization server clock values, the synchronization clients calculate relative lag values, by comparison to their own clock values. The synchronization client provides target seek times to paired media clients for a media client to seek that offset value within the media object, establishing and maintaining playback synchronization among the synchronization group.

These and other features, aspects, and advantages of the invention will become better understood with reference to the following description, and accompanying drawings.

DETAILED DESCRIPTION

Figure 1A:
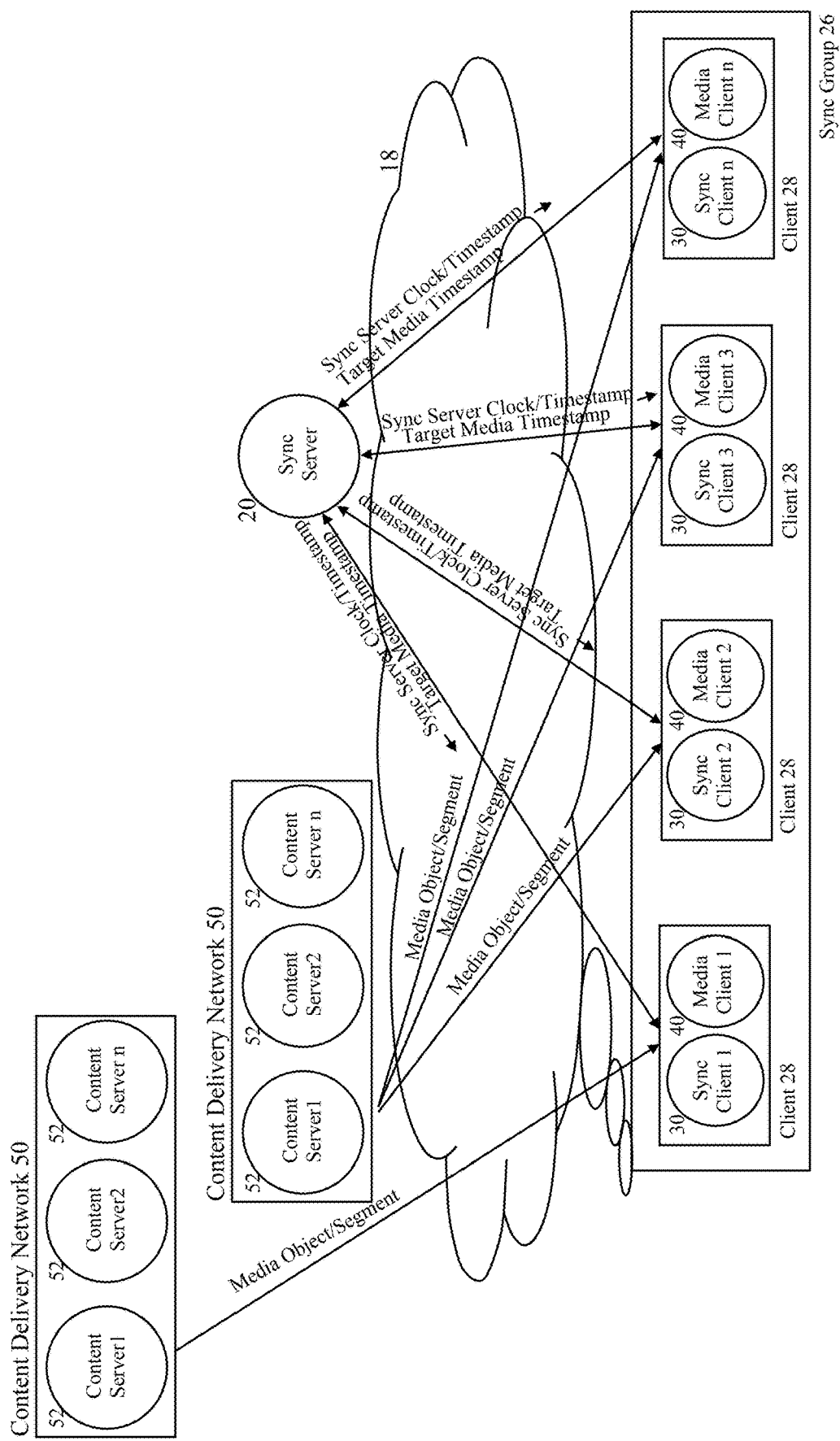
FIGS. 1A and 1B depicts block diagrams of major components of embodiments of a system according to the current invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention is directed to systems and processes for synchronized media object 60 playback among a group 26 of clients 28. In various embodiments, media objects 60 are streamed from content servers 52 over a network 18. The synchronized media object 60 playback is facilitated by client 28 to synchronization server 20 communication based on timestamps from the clocks on the computers 20 28.

Figure 1B:
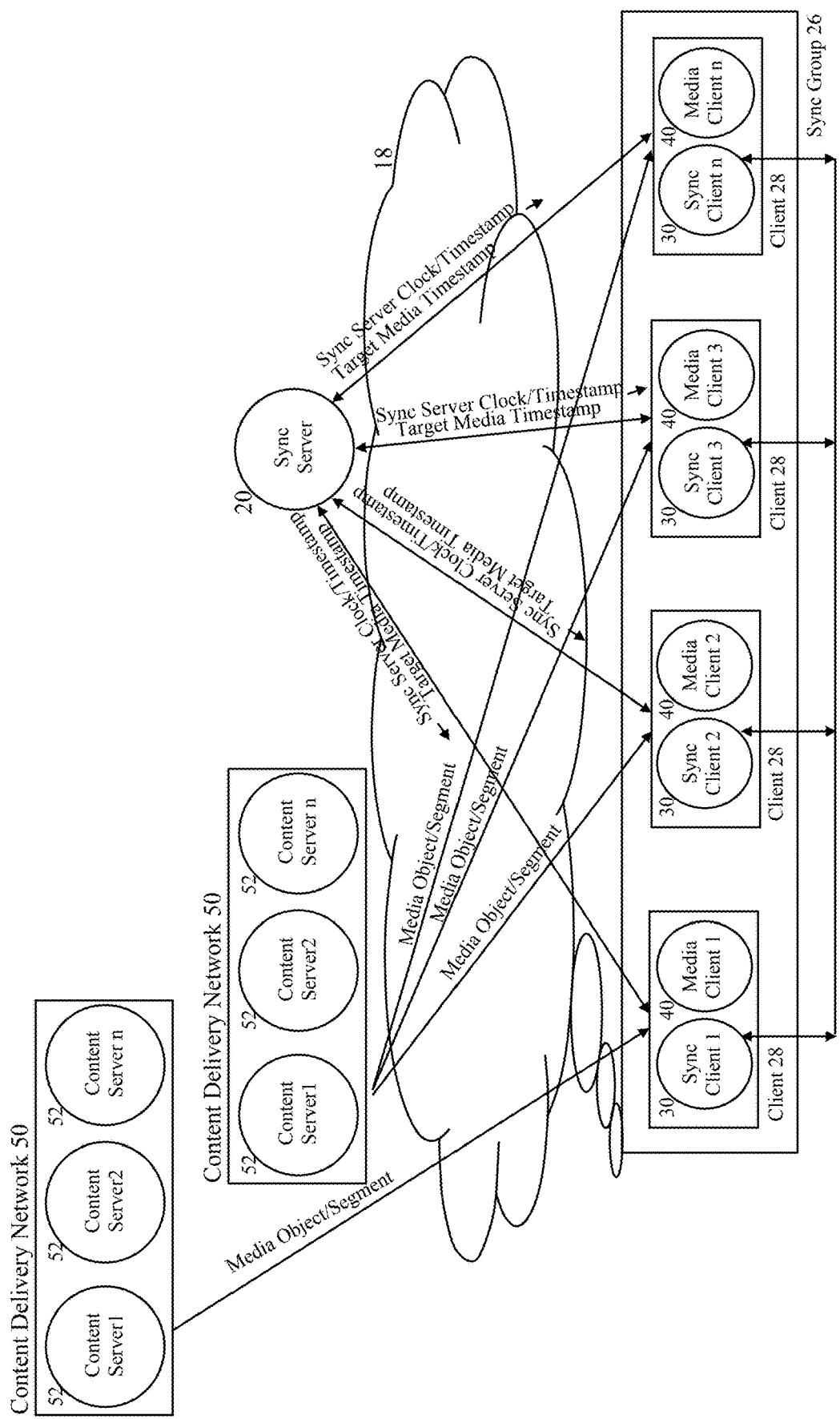

FIGS. 1A and 1B depict block diagrams of major components of systems of embodiments of the current invention. Depicted are content servers 52 within content delivery networks 50 streaming media objects 60 to clients 28, with the clients 28 within a synchronization group 26 also in communication with a synchronization server 20.

The servers 20 52 and clients 28 are implemented on computers. A computer includes a processor and memory for storing data and program instructions. Memory may include any memory or database and may take the form of volatile or non-volatile memory including, without limitation, magnetic media, optical media, random access memory (RAM), read-only memory (ROM), removable media, or any other suitable local or remote memory component. Memory may store various objects or data, including source code, object code, classes, applications, databases, and any other appropriate information including any parameters, variables, algorithms, instructions, rules, constraints, or references thereto associated with the purposes of computer. Further, the computer may be in various form factors such as desktop, laptop, smartphone, media player, wearable, or other form factors. Additionally, suitable computers contain a clock 22, operable to keep time. The computers may implement protocols such as Network Time Protocol to synchronize their clocks to a time reference.

Content servers 52 are computers that store and stream media objects 60 to clients 28. A content server 52 stores and transmits media objects 60. The content server 52 employs storage, such as a hard drive, network attached storage, or other means for making media objects 60 available to clients 28. The content server 52 also contains applications to enable clients 28 to access their media objects 60 remotely. Those applications might include access controls to the media objects 60, such as digital rights management (DRM) or other access controls. Further the content servers 52 may be nodes within a content distribution network (CDN) 50, a distributed network of content servers 52, with one or more proxy servers directing clients 28 to content servers 52 based on load, speed, latency, and others factors, with a goal to distribute geographically distributed end-user clients with high availability and high performance access to media objects 60. CDN 50 nodes 52 may be peered. Transmission of the media objects 60 to clients 28 can be a single complete transmission of a media object 60 or in media object segments 64.

Suitable content servers 52 communicate with clients 28 over a network 18 with enough bandwidth to allow access to that media objects 60. A network 18 may include one or more wide area networks (WANs), local area networks (LANs), personal area networks (PANs), mesh networks, all or a portion of the Internet, and/or any other communication system or systems at one or more locations. Network 18 may be all or a portion of a home or enterprise network, while in another instance at least a portion of the network 18 may represent a connection to the Internet. Further, all or a portion of network 18 may comprise either a wired or wireless link. In other words, network 18 encompasses any internal or external network, networks, sub-network, or combination thereof operable to facilitate communications between various computing components inside and outside the illustrated environment. Certain network configurations may employ transmission medium suitable for proximate computers. The transmission medium can include sound (eg infrasonic or ultrasonic), wifi, Bluetooth, or line-of-sight of sight media.

Figure 3:
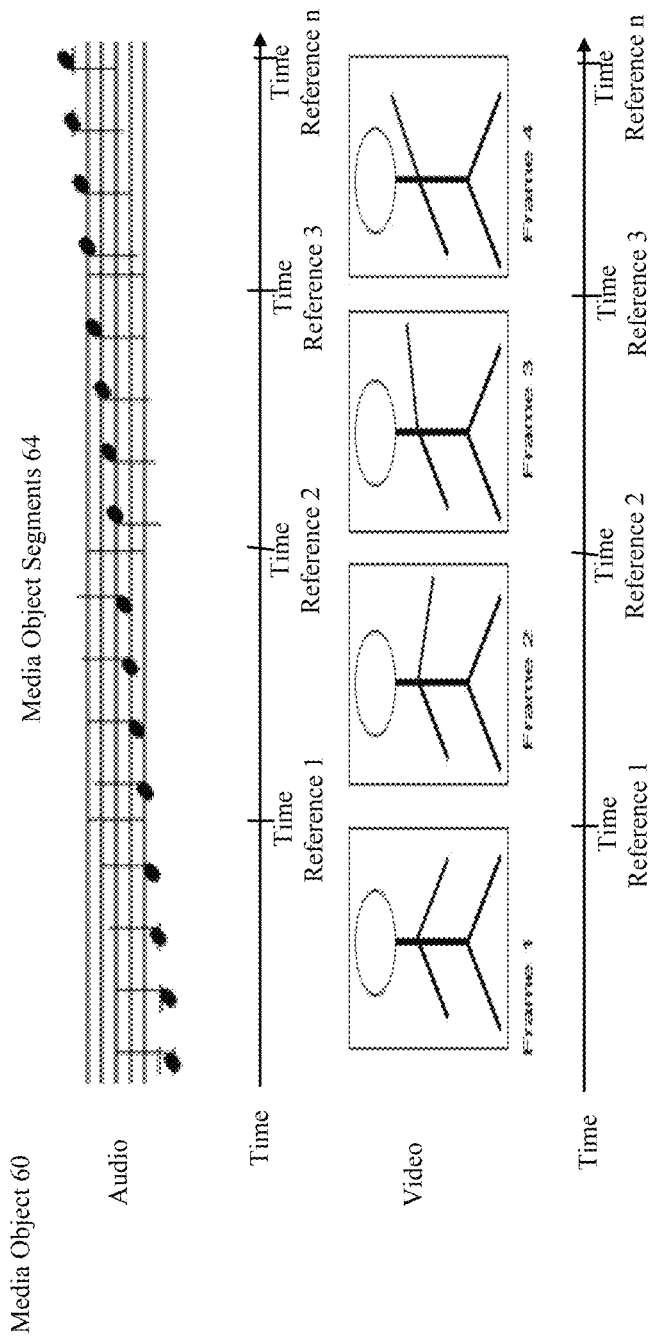
FIG. 3 depicts representative media objects and media segments and example time references.

Media objects 60, shown in FIG. 3, are the content to be streamed from a content server 52 to a client 28, such as audio, video, and other content. In exemplary configuration, media objects 60 are identifiable. Media objects 60 may be transmitted with associated metadata, such as unique identifiers. For example, an audio media object 60 might have a unique identifier assigned for common reference, such as in repositories having media listings along with identifiers. Other metadata identifiers can include author, title, duration, genre, and other categorizing information. Indirect identifying information can include duration, sample rate, bit rate, waveform fingerprints, and other characteristics or data known in the art.

Further, suitable media objects 60 are capable of random access to a media objects segments 64 therein. Representative suitable formats can include MPEG-1 Audio Layer III, MPEG-4, comma separated values, and the like. For example, a media client 40 "playing" the media object 60 can move directly to a target reference/offset within the media object 60. To illustrate using a time offset from the beginning of a media stream, audio/video/sensor media objects 60 can be accessible at target time references 62. Using a provided time reference or calculating a time reference 62, a media client 40 can directly move to a target media object segment 64 within the media object 60. For instance, an audio media client 40 may seek a target time reference 62 for a given audio segment or a video media client 40 may seek a target time reference 62 representing a given video frame.

An exemplary synchronization server 20 is a computer independent of a content delivery network 50 and its contents servers 52 which facilitates synchronized media object playback among a synchronization group 26. In other words, an exemplary synchronization server is communicatively disposed outside the local area network of the contents servers 52 and has no higher level of access to the content servers 52 than the clients 28 within the synchronization group 26. In exemplary configuration, the client 28 members of the synchronization group 26 periodically communicate with the synchronization server 20 over a network 18, receiving in part the synchronization server's 20 clock, a timestamp representing a specific point in time, as a reference for time alignment among the synchronization group 26. Additionally, the synchronization server 20 periodically transmits a timestamp for a target time reference 62 within a given media object 60 during the synchronization group 26 playback of that media object 60. The target time reference may be transmitted directly or indirectly. For example, it may be provided directly as time within the media object, it could use either another clock value (as written) or a time-delta from the already-included clock value, or other approaches to communicate clock values or differences.

A client 28 is a computer implemented with instructions operable to play a given media object 60 in synchronization with other clients 28 in the synchronization group 26. The depicted client 28 includes a synchronization client 30 paired in communication with a media client 40.

The synchronization client 30 is operable to calculate a relative lag and provide seek time instructions to its paired media client 40 for a media object 60 currently being played. The synchronization client 30 queries the clock of the synchronization server 20. Due to lag in the query response, with the lag including time such as the amount of delay between when a synchronization client 30 sends the query, when the synchronization server 20 processes it, and the query response arrives at the synchronization client 30. The relative lag accounts for both the propagation of communication signals between the synchronization client 30 and the synchronization server 20, as well as the error in clock-alignment between the synchronization client 30 and the synchronization server 20. In certain configurations, to calculate a relative delta, a synchronization client 30 periodically sends a query to the synchronization server 20, and the synchronization server 20 responds with its current clock time, as a timestamp. As the synchronization client 30 receives the synchronization server 20 responses, it compares the received clock time to its own internal clock time and stores the results in a data structure, such as a ring-buffer or other data structure. A relative lag is calculated based on recent values. In exemplary process, a moving average, mean, or median is calculated, weighted or otherwise, such as a truncated-mean approach. This results in the synchronization client 30 have a running measurement of its offset relative to the synchronization server's 20 clock. The relative lag, along with a timestamp for a target time reference/offset 62 within a media object 60 and buffering time serve as the primary basis for instruction to a paired media client 40 in order to maintain synchronization among the clients 28 participating in the synchronization group 26.

Additionally, in response to the synchronization client 30 query, the synchronization server 20 transmits a timestamp for a target time reference 62 within the media object 60. That timestamp being the clock value that was (or will be) assigned to the media object 60 at the target time reference 62. Alternatively, where the synchronization client 20 query includes its lag values, the synchronization server 20 can use the known information about the synchronization client's 30 lag measurement to assign a timestamp that will minimize (or eliminate) any corrections necessary for that synchronization client 30 or others within the synchronization group 26.

The media client 40 includes instructions to render the media object 60 and seek to target offsets 62 within the media object 60 in response to synchronization server 20 to synchronization client 30 communications and processing. For example, for an audio media object 60, a suitable media client 40 can play audio and move to a target time reference 62 within the audio stream. For example, for a video media object 60, a suitable media client 40 can play video and seek to a target time reference 62 within the video stream. Upon receiving a relative lag and target time reference 62 within the media object 60, the media client 40 may move to that target time reference 62, the target time reference 62 adjusted by the relative lag. When a media client's 40 current position differs from the target time reference provided by the synchronization client 30, it seeks/moves to the provided target time reference. It may do so by an instantaneous seek, or other techniques include adjusting the speed of the media playback to make incremental or less perceptible adjustments to the media playback over time to gradually reach the target time reference 62.

Although a client 28 has been depicted as comprising both a synchronization server client 30 and a media client 40, it is within the scope of this invention for clients 28 to have other configurations. For example, in a building with a single network 18 where minimal lag difference is expected among local clients 28 relative to the content server 52, it may be desirable to deploy a single synchronization client 30 for synchronization server 20 communication and lag calculation for multiple media clients 40 within that building.

In other embodiments, alternatively or in addition to a relative lag and target time reference 62, higher fidelity synchronization is accomplished by accounting for buffering-time from network retrieval or storage retrieval of media object data from content servers 52 or local storage. In certain configurations, the received target time reference 62 may be further adjusted by accounting for that buffering-time from content servers 52 or other media object 60 provider.

In certain configurations, media clients 40 make assumptions about the delay between retrieving and playing this media object 60 for higher fidelity synchronization within the synchronization group 26. Media clients 40 add this assumed delay to the target time reference 62, request additional media object 62 data from the content server 52 offset by this adjusted time reference 62, and then wait for the duration of the buffer-time to begin playing the retrieved modia object 60 at the adjusted time reference 62.

Figure 2:
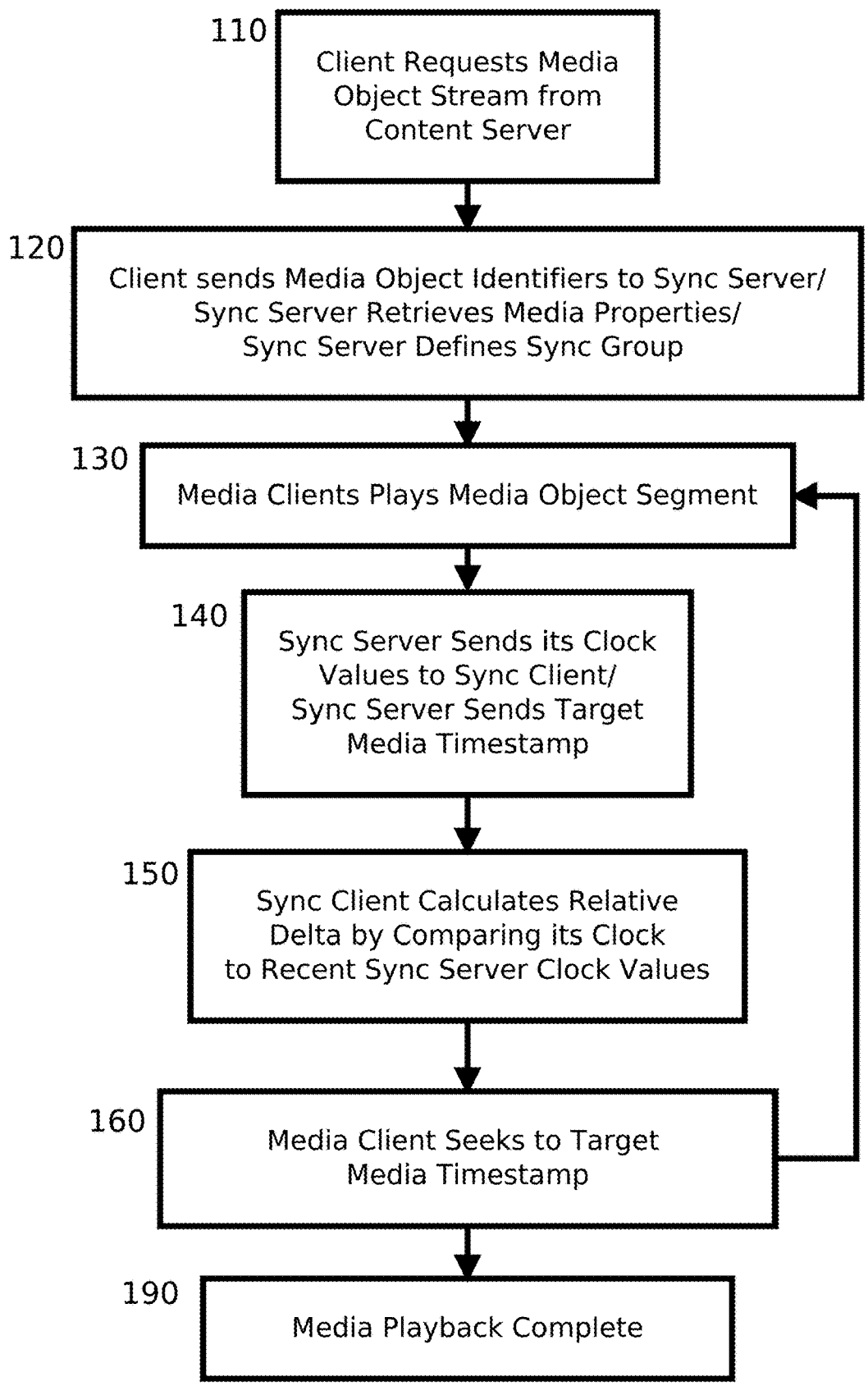
FIG. 2 depicts a flowchart of major steps of an embodiment of a process according to the current invention.

Having described major components of an embodiment of a system, a representative embodiment of a process is now described. FIG. 2 illustrates an embodiment of a process of the current invention.

At step 110, a client 28 requests a media object or a media object segment therein from the content server. The media client 40 requests a media object 60, a song for example, over the network 18 from a content delivery network 50. The CDN routes the media client 40 to content server 52. The content server 52 streams a part or all of the media object 60 to the media client 40.

Other clients 28 may subscribe to the synchronization group 26 for that same media object 60 at that time, with all of the subscribed clients 28 to that media object 60 at that time defining a synchronization group 26. At step 120, the client 28 sends media object 60 identifiers to the synchronization server 20. The synchronization server 20 uniquely identifies the media object 60 of the client 28. The synchronization server 20 queries for availability of that same media object 60 across known CDN providers 50. The synchronization server 20 then distributes network access information for that media object 60, containing information about how to access identical (or similar) media objects 60 from CDNs known by the synchronization server 20. The clients 28 within the synchronization group 26 use the network access information for that media object 60 to retrieve some or all of the media object 60. The respective content server(s) 52 streams part or all of the media object 60 to the respective client(s) 40.

At step 130, the media clients 40 renders one or more media object 60 segments 64.

At step 140, within playback, synchronization clients 30 across the synchronization group 26 periodically request the clock value from the synchronization server 20. The synchronization server 20 responds to the respective synchronization client 30 requests with its clock value as a timestamp and also a timestamp for a target time reference 62 within the media object 60 for the synchronization group 26.

At step 150, each synchronization client 30 within the synchronization group 26 calculates its relative delta by comparing its own clock time to recent synchronization server provided 20 timestamp values. Each synchronization client 30 provides a seek position within the media object 60 to its paired media client 40, that seek position being the synchronization server 20 provided target time reference adjusted by the relative lag.

At step 160, each media client 40 within the synchronization group 26 moves to the seek position, optionally further adjusting the seek position value with a buffer time adjustment for network or storage retrieval of the media object 60 segment within the seek target range. Where clients 28 have similar latency with respect to the media object 60 provider, local synchronization clients 30 can directly communicate their timestamps to each other, enabling more precise alignment with other clients 28. In other words, this sending of timestamp information to one another can constitute a secondary alignment mechanism. At this point, the media clients 40 within the synchronization group 26 are synchronized.

Media client media object segment playback 130 continues until media playback is complete 190.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for facilitating media object content playback, said system comprising:
one or more synchronization servers comprising instructions for execution on a computer for calculating a plurality of timestamps representing specific points in time as determined by the synchronization server;
a plurality of media clients each in communication with one or more synchronization clients, said media clients each comprising instructions for execution on a computer for receiving media object content over a network from a plurality of content servers and playing said media object content;
wherein said plurality of content servers comprise instructions for execution on a computer for storing and providing media object content over a network and said content servers comprise nodes within a content distribution network comprising a plurality of nodes;
said synchronization client comprising instructions for execution on a computer to calculate a client timestamp as determined by the computer and calculate a time lag related to the difference between a timestamp provided by a synchronization server and. the client timestamp;
the plurality of said media clients each receiving media object content from a plurality of content servers wherein a synchronization group comprises a plurality of said media clients each receiving related media object content;
said synchronization client of each of said media client members of a synchronization group being configured to periodically communicate with a synchronization server over a network and to request from the synchronization server a plurality of server timestamps representing a specific point in time;
the synchronization server configured to periodically transmit a reference timestamp for a target time reference within a given media object content that was retrieved by a plurality of media clients of a synchronization group to a synchronization client during the synchronization group playback of said media object content being played;
said synchronization client calculating a time lag utilizing the differences in a plurality of said server timestamps received from the synchronization server and client timestamps;

said media client receiving seek time instructions from said synchronization client wherein said seek time instruction comprise a time stamp related to said received media content and wherein said seek time instructions are calculated utilizing the calculated time lag and wherein said seek time instructions are not received with said media object content;

wherein said media client is configured to request a secondary time lag from a different media client member of the synchronization group wherein the secondary time lag is the time lag calculated by said different media client:

and wherein said media client is configured to playback received media object content based upon the reference timestamp as adjusted by the calculated time lag of said synchronization clients.

2. The system of claim 1, wherein said media object content received by said media client within said synchronization group is non-identical to media object content received by another media client within said synchronization group.

3. The system of claim 1, wherein said seek time instructions are transmitted as a time-delta from a previously provided timestamp.

4. The system of claim 1, wherein the speed of the media playback is incrementally adjusted to reach the target timestamp.

5. The system of claim 1, wherein said time lag is calculated as an average of recent said timestamp differences.

6. The system of claim 1, wherein said time lag is further adjusted by the buffer-time in retrieving said media object content or media object content segment.

7. A process for media object rendering, said process comprising the steps of:

providing a plurality of clients, said clients comprising a media client and said clients in communication with a synchronization client, said clients defining a synchronization group;

said media clients comprising instructions for execution on a computer for each media client receiving media object content over a network from a plurality of content servers, rendering said media object content, and playing said media object content in response synchronization client seek time instructions;

wherein said plurality of content servers comprise instructions for execution on a computer for storing and providing media object content over a network and said content servers comprise nodes within a content distribution network comprising a plurality of nodes;

said synchronization client periodically requesting a timestamp from the synchronization server;

said synchronization client comprising instructions for execution on a computer to calculate a time lag and provide seek time instructions to said media clients for a media object being played; said time lag being calculated by utilizing the differences between a plurality of timestamps received from the synchronization server and a plurality of timestamps calculated on the synchronization client;

said synchronization server comprising instructions for execution on a computer, said synchronization server responding to the synchronization client queries with internal clock value as a timestamp for a target time reference within said media object content for the synchronization group;

wherein said synchronization client is configured to request a secondary time lag from a different synchronization client member of the synchronization group wherein the secondary time lag is the time lag calculated by said different synchronization client;

and wherein said synchronization server does not send the timestamp to the synchronization client with said media object content; and wherein said synchronization group receives related media object content.

8. The process of claim 7, wherein said media object content received by said media client within said synchronization group is non-identical to media object content received by another media client within said synchronization group.

9. The process of claim 7, wherein said target time reference is transmitted as a time delta from a previously provided clock value.

10. The process of claim 7, Wherein the speed of the media playback is incrementally adjusted to reach the target time reference.

11. The system of claim 7, wherein said time lag is calculated as an average of recent said timestamp differences.

12. The process of claim 7, wherein said time lag is further adjusted by the buffer-time in retrieving said media object content.

13. A computer program product encoded on a non-transitory, tangible storage medium, the product comprising computer readable instructions for causing one or more processors to perform operations comprising media object playback, said computer program product comprising:

providing a plurality of clients, said clients comprising a media client and said clients in communication with a synchronization client, said clients defining a synchronization group;

said media clients comprising instructions for execution on a computer for each media client receiving media object content over a network from a plurality of content servers, rendering said media object content, and playing said media object content in response synchronization client seek time instructions;

wherein said plurality of content servers comprise instructions for execution on a computer for storing and providing media object content over a network and said content servers comprise nodes within a content distribution network comprising a plurality of nodes;

said synchronization client periodically requesting a timestamp from the synchronization server;

said synchronization client comprising instructions for execution on a computer to calculate a time lag and provide seek time instructions to said media clients for a media object being played; said time lag being calculated by utilizing the differences between a plurality of timestamps received from the synchronization server and a plurality of timestamps calculated on the synchronization client;

said synchronization server comprising instructions for execution on a computer, said synchronization server responding to the synchronization client queries with internal clock value as a timestamp for a target time reference within said media object content for the synchronization group;

wherein said synchronization client is configured to request a secondary time lag from a different synchronization client member of the synchronization group wherein the secondary time lag is the time lag calculated by said different synchronization client;

and wherein said synchronization server does not send the timestamp to the synchronization client with said media object content; and wherein said synchronization group receives related media object content.

14. The computer program product of claim 13, wherein said target time reference is transmitted as a time-delta from a previously provided timestamp.

15. The computer program product of claim 13, wherein the speed of the media playback is incrementally adjusted to reach the target time reference.

16. The computer program product of claim 13, where said time lag is calculated as an average of recent said clock differences.

17. The computer program product of claim 13, wherein said time lag is further adjusted by the buffer-time in retrieving said media object content.

* * * * *